United States Patent
Makki et al.

(10) Patent No.: US 12,267,763 B2
(45) Date of Patent: Apr. 1, 2025

(54) RELAYING IN A WIRELESS COMMUNICATION NETWORK

(71) Applicant: Telefonaktiebolaget LM Ericsson (publ), Stockholm (SE)

(72) Inventors: Behrooz Makki, Pixbo (SE); Mikael Coldrey, Borås (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 463 days.

(21) Appl. No.: 17/795,634

(22) PCT Filed: Jan. 31, 2020

(86) PCT No.: PCT/SE2020/050085
§ 371 (c)(1),
(2) Date: Jul. 27, 2022

(87) PCT Pub. No.: WO2021/154130
PCT Pub. Date: Aug. 5, 2021

(65) Prior Publication Data
US 2023/0077071 A1    Mar. 9, 2023

(51) Int. Cl.
*H04W 40/22* (2009.01)
*H04B 7/155* (2006.01)
(Continued)

(52) U.S. Cl.
CPC ........ *H04W 40/22* (2013.01); *H04B 7/15507* (2013.01); *H04B 7/2606* (2013.01); *H04W 40/12* (2013.01)

(58) Field of Classification Search
CPC .. H04W 40/22; H04W 40/12; H04B 7/15507; H04B 7/2606
See application file for complete search history.

(56) References Cited

U.S. PATENT DOCUMENTS 9,148,217 B2 *  9/2015  Kim ................ H04B 7/2606
2006/0229017 A1   10/2006  Larsson et al.
(Continued)

FOREIGN PATENT DOCUMENTS

WO    2019042406 A1    3/2019

OTHER PUBLICATIONS

Author Unknown, "Technical Specification Group Radio Access Network; Study on Integrated Access and Backhaul; (Release 15)," Technical Report 38.874, Version 0.6.1, Nov. 2018, 3GPP Organizational Partners, 90 pages.
(Continued)

*Primary Examiner* — Brian T O Connor
(74) *Attorney, Agent, or Firm* — Weisberg I.P. Law, P.A.

(57) ABSTRACT

The present disclosure relates to a first type node (AP1) in a wireless communication system, wherein the first type node (AP1) is adapted to: communicate with at least one neighboring first type node (AP0, AP2) via a corresponding backhaul channel (H10, H21); receive communication from at least one overheard second type node (U3k) via a corresponding overheard access channel (h3k_1), the overheard second type node (U3k) being adapted to normally communicate with a serving first type node (AP3); instruct at least one overheard second type node (U3k) to pause transmission to the serving first type node (AP3) at time instants (T+2) when the first type node (AP1) is going to receive a certain signal (x3k(T)) from the neighboring first type node (AP2), where the certain signal (x3k(T)) is intended to be received by the first type node (AP1) without interference from said overheard second type node (U3k).

19 Claims, 6 Drawing Sheets

(51) Int. Cl.
*H04B 7/26* (2006.01)
*H04W 40/12* (2009.01)

(56) References Cited

U.S. PATENT DOCUMENTS

| | | |
|---|---|---|
| 2009/0185521 A1 | 7/2009 | Li et al. |
| 2010/0034135 A1* | 2/2010 | Kim .................. H04W 72/0446 370/315 |
| 2011/0310747 A1 | 12/2011 | Seo et al. |
| 2011/0319084 A1 | 12/2011 | Meshkati et al. |
| 2013/0137364 A1 | 5/2013 | Redana et al. |
| 2015/0327265 A1 | 11/2015 | Lee et al. |
| 2022/0141910 A1* | 5/2022 | Muhammad .......... H04W 40/24 |

OTHER PUBLICATIONS

Extended European Search Report for European Patent Application No. 20916585.1, mailed Sep. 21, 2023, 12 pages.
Huawei, "R2-1810695: Overview consideration on RAN1 IAB aspects," 3GPP TSG-RAN WG2 #AH1807, Jul. 2-6, 2018, Montreal, Canada, 3 pages.
International Search Report and Written Opinion for International Patent Application No. PCT/SE2020/050085, mailed Dec. 9, 2020, 12 pages.

\* cited by examiner

RELAYING IN A WIRELESS COMMUNICATION NETWORK

This application is a 35 U.S.C. § 371 national phase filing of International Application No. PCT/SE2020/050085, filed Jan. 31, 2020, the disclosure of which is incorporated herein by reference in its entirety.

TECHNICAL FIELD

The present disclosure relates to relaying in wireless communication networks, in particular in integrated access and backhaul (IAB) networks.

BACKGROUND

The fifth generation of wireless networks (5G) must provide high-rate data streams for everyone everywhere at any time. To meet such demands, it is required to use large bandwidths. Here, it is mainly concentrated on millimeter wave-based, potentially, massive multiple-input and multiple-output (MMIMO), links as a key enabler to obtain sufficiently large bandwidths/data rates. Importantly, the presence of very wide bandwidths makes it possible to include the wireless backhaul transport in the same spectrum as the wireless access. In such a setup, there is thus a sharing of radio resources between access and backhaul links which implies that access and backhaul links compete over the same radio resources pool.

For this reason, 3GPP has considered such integrated access and backhaul (IAB) network configurations where an access point (AP), that for example can be fiber-connected, provides other AP:s as well as the customer-premises equipments (CPE:s) inside its cell area with wireless backhaul and access connections, respectively. The access-integrated backhaul link can either be a single-hop or multi-hop link in an IAB network. In a multi-hop deployment, the IAB network from one AP is relayed along a certain route from AP to AP until it reaches its destination. IAB networks can thus have either star-like configuration with multiple AP:s wirelessly backhauled through direct single-hop connections to the fiber-connected AP, or a cascade configuration with AP:s wirelessly connected to the fiber-connected AP in a multi-hop fashion.

The network can thus be densified with a large number of access points (AP:s), each one serving a number of CPE:s inside its corresponding small cell area. Compared to the cases with few macro BSs covering a wide area, less path loss/shadowing, and higher LOS connection probability are expected in dense small-cell networks. As a result, better channel quality is experienced in these short-range links, compared to the cases with few macro BSs. Due to high installation cost of fiber links as well as traffic jams and infrastructure displacements, the small AP:s need to be supported by high-rate LOS wireless backhaul links.

Among the advantageous of IAB networks are the followings:

Cost Reduction:

A fiber optic link is relatively expensive in metropolitan areas, with a majority of the total figure tied to trenching and installation. For this reason, as well as the traffic jams and infrastructure displacements, some cities have considered a moratorium on fiber trenching specially in historical areas. In such scenarios, millimeter wave-based wireless backhaul is the best alternative providing almost the same rate as fiber optic with significantly less price and no digging.

Link Quality Enhancement:

Compared to the direct macro base station (BS)-CPE link, less path loss/shadowing, and higher line-of-sight (LOS) connection probability are expected for the wirelessly backhauled AP-CPE connections within small cells. As a result, better channel quality is experienced in such small cells, compared to the cases with direct macro BS-CPE connection.

Long-Term Network Planning:

IAB systems are of most interest in small cell backhaul and fixed wireless access (FWA) networks with stationary AP:s/CPE:s. This makes it possible to predict the channel quality and perform accurate network planning for multiple packet transmissions.

In an IAB network, among the main challenges are 1) resource allocation in the overloaded backhaul links and 2) interference mitigation. Particularly, the AP-AP backhaul links transfer an aggregated data of a large number of CPE:s served by different AP:s in a multi-hop setup, which leads to high load of the backhaul links. From another perspective, as the number of hops and/or CPE:s per hop increases the interference increases which may affect the system performance significantly. Such issues are so problematic that 3GPP has recently suggested to develop effective techniques for measuring and mitigating the network interference. To support many CPE:s/hops, it is thus desired to provide transmission methods which not only compensate for the network interference, but also reduce the load of the AP-AP links.

Generally, it is therefore a desire to have a node in a wireless communication system that provides transmission methods which not only compensate for the network interference, but also reduces the load of the AP-AP links.

SUMMARY

It is an object of the present disclosure to provide a node in a wireless communication system which communicate with at least one other node, where blockage/error propagation is compensated for.

This object is obtained by means of a first type node in a wireless communication system, where the first type node is adapted to communicate with at least one neighboring first type node in the wireless communication system via a corresponding backhaul channel, and to receive communication from at least one overheard second type node via a corresponding overheard access channel. The overheard second type node is adapted to normally communicate with a serving first type node. The first type node is further adapted to instruct at least one overheard second type node to pause transmission to the serving first type node at time instants when the first type node is going to receive a certain signal from the neighboring first type node. The certain signal is intended to be received by the first type node without interference from said overheard second type node that has been instructed to pause transmission.

This means that since the overheard second type node pauses transmission to the serving first type node at said time instants. the first type node does not receive communication from the overheard second type node via the overheard access channel at these time instants, and thus the overheard second type node does not produce interfering signals to the first type node. The serving first type node can still receive signals from other suitable second type nodes.

According to some aspects, the first type node is adapted to perform channel measurements in order to determine the presence of overheard second type nodes and isolated second type nodes, where an overheard second type node is able to communicate with the serving first type node, and to communicate with the first type node that is separate from the serving first type node, and where an isolated second type node is able to communicate with its serving first type node only.

Such channel measurements can be performed offline in order to obtain relevant information.

According to some aspects, the first type node is adapted, at a first time instant, to receive and buffer both a first signal from a neighboring first type node and an overheard second signal from the overheard second type node, and, at a future time instant, to receive and buffer the second signal from the neighboring first type node. The second signal from the neighboring first type node is intended to be received by the first type node without interference from said overheard second type node. The first type node is further adapted to separate and decode the received and buffered signals.

This means that joint scheduling in different hops and the message decoding adaptation reduces the HARQ (Hybrid Automatic Repeat Request) cost, the implementation complexity and the backhauling load of the first node links. Particularly, instead of deteriorating the system performance by interference, it is utilized as a useful signal to improve the backhauling capability of the wireless communication system. Also, bypassing some first type nodes in the multi-hop route, the present disclosure enables more retransmissions which reduces the end-to-end error probability with no delay penalty. The spectrum which becomes free can be used to serve other second type nodes which leads to higher end-to-end throughput in the wireless communication system and may give the chance to increase the number of hops and/or the number of second type nodes per hop.

According to some aspects, the first type node is adapted to separate and decode the received and buffered signals by means of successive interference cancelling.

This means that a well-known procedure can be applied for the present disclosure.

According to some aspects, the communication between all first type nodes is a backhaul communication via at least one corresponding backhaul channel, and at least one first type node is adapted to communicate with a corresponding group of second type nodes via a corresponding access channel. The backhaul communication and the access communication are both performed by means of common equipment at each one of the first type nodes.

This means that the present disclosure is applicable for IAB networks.

This object is also obtained by means of an overheard second type node in a wireless communication system, where the overheard second type node is adapted to communicate with a serving first type node in the wireless communication system via a corresponding access channel, and to communicate with another first type node in the wireless communication system via a corresponding overheard access channel. The overheard second type node is adapted to pause transmission to the serving first type node at time instants when the other first type node is going to receive a certain signal from a neighboring first type node, where the certain signal is intended to be received by the other first type node without interference from the overheard second type node.

This means that since the overheard second type node pauses transmission to the serving first type node at said time instants. the first type node does not receive communication from the overheard second type node via the overheard access channel at these time instants, and thus the overheard second type node does not produce interfering signals to the first type node. The serving first type node can still receive signals from other suitable second type nodes.

According to some aspects, the overheard second type node is adapted to receive instructions from the serving first type node or the other first type node, where the instructions relate to at which time instants to pause transmission to the serving first type node.

This means that control signal data transmissions are synchronized.

This object is also obtained by means of a first type node in a wireless communication system where the first type node is adapted to communicate with at least one neighboring first type node in the wireless communication system via a corresponding backhaul channel, and to communicate with a corresponding group of second type nodes via a corresponding access channel. The first type node is further adapted to acquire information regarding the presence of overheard second type nodes and isolated second type nodes. An overheard second type node is able to communicate with the first type node and to communicate with a remote first type node that is separate from the first type node, and an isolated second type node is able to communicate with the first type node only.

According to some aspects, the first type node is adapted to pair one overheard second type node with one isolated second type node, and to control synchronization of signal data transmissions of the paired second type nodes.

This enables using a useful signal to improve the backhauling capability of the wireless communication system which in turn enables more retransmissions which reduces the end-to-end error probability with no delay penalty. The spectrum which becomes free can be used to serve other second type nodes which leads to higher end-to-end throughput in the wireless communication system and may give the chance to increase the number of hops and/or the number of second type nodes per hop.

This object is also obtained by means of a wireless communication system comprising first type nodes and second type nodes, where the communication between all first type nodes is a backhaul communication via at least one corresponding backhaul channel. At least one first type node is adapted to communicate with a corresponding group of second type nodes via a corresponding access channel, where the backhaul communication and the access communication both are performed by means of common equipment at each one of the first type nodes. The communication system is adapted to perform channel measurements in order to determine the presence of overheard second type nodes and isolated second type nodes. An overheard second type node is able to communicate with its serving first type node and to communicate with a remote first type node that is separate from its serving first type node. An isolated second type node is able to communicate with its serving first type node only.

According to some aspects, the communication system is adapted to pair one overheard second type node with one isolated second type node, and to control synchronization of signal data transmissions of the paired second type nodes.

This enables using a useful signal to improve the backhauling capability of the wireless communication system which in turn enables more retransmissions which reduces the end-to-end error probability with no delay penalty. The spectrum which becomes free can be used to serve other second type nodes which leads to higher end-to-end throughput in the wireless communication system and may give the chance to increase the number of hops and/or the number of second type nodes per hop.

This object is also obtained by means of methods that are associated with the above advantages.

BRIEF DESCRIPTION OF THE DRAWINGS

The present disclosure will now be described more in detail with reference to the appended drawings, where.

DETAILED DESCRIPTION

Figure 1:
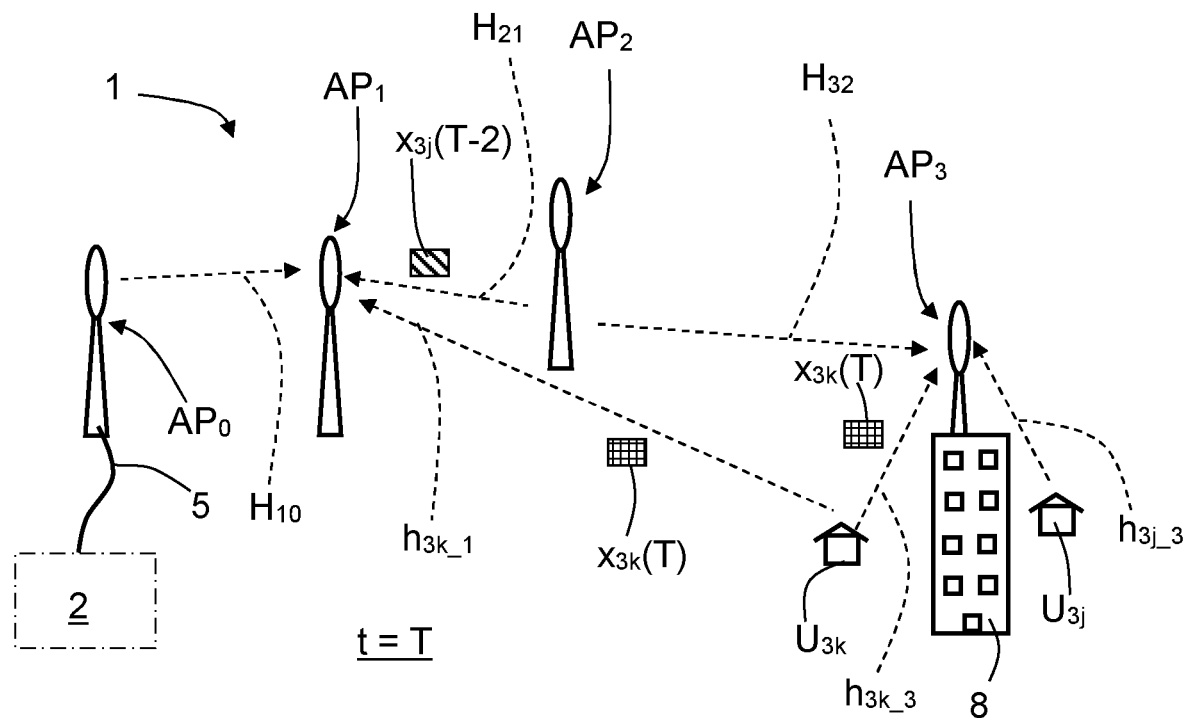
FIG. 1 schematically shows a view of a wireless communication system at a first time instant.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

The next generation of wireless networks must provide high-rate data streams for everyone everywhere at any time. To address these demands, the main strategy persuaded in the last few years is the network densification. Here, the idea is to densify the network with a large number of access points (AP:s) each one serving a number of customer-premises equipments CPE:s) inside its corresponding small cell area. Compared to the cases with few macro base stations covering a wide area, less path loss/shadowing, and higher line-of sight (LOS) connection probability are expected in dense small-cell networks. As a result, better channel quality is experienced in these short-range links, compared to the cases with few macro base stations.

Network densification takes advantage of wireless backhaul; due to a relatively high installation cost of fiber links, as well as traffic jams and infrastructure displacements, the relatively small access points (AP:s) need to be supported by high-rate LOS wireless backhaul links which motivates so-called integrated access and backhaul (IAB) networks.

With reference to FIG. 1, there is a wireless communication system 1 comprising an IAB network with three hops. There are first type nodes $AP_0, AP_1, AP_2, AP_3$ in the wireless communication system 1, here in the form of a first access point $AP_0$, a second access point $AP_1$, a third access point $AP_2$ and a fourth access point $AP_3$. The access points $AP_0$, $AP_1, AP_2, AP_3$ are arranged for communication with each other in the wireless communication system 1 over a corresponding backhaul channel $H_{10}, H_{21}, H_{32}$, having a channel quality, generally by means of one of at least one type of signal relaying that employs decoding and encoding.

Each access point $AP_0$, $AP_1$, $AP_2$, $AP_3$ is adapted for access communication with a corresponding group of second type nodes. For the sake of clarity in the example to be described, only two second type nodes $U_{3j}, U_{3k}$ are shown, and are served by the fourth access point $AP_3$. All access points normally serve a corresponding group of second type nodes, and the fourth access point $AP_3$ can serve more than the two second type nodes $U_{31}, U_{32}$ shown. The fourth access point $AP_3$ is adapted for access communication with the two second type nodes $U_{3j}, U_{3k}$ via a corresponding access channel $h_{3j\_3}, h_{3k\_3}$, providing wireless access. The second type nodes $U_{3j}, U_{3k}$ are here in the form of customer-premises equipment (CPE:s), and generally each group of CPE:s $U_{3j}, U_{3k}$ comprises at least one CPE. Here the group that is served by the fourth access point $AP_3$ comprises a first CPE $U_{3j}$ and a second CPE $U_{3k}$, where the fourth access point $AP_3$ is adapted for access communication with the two CPE:s via a corresponding first access channel $h_{3j\_3}$ and second access channel $h_{3k\_3}$.

The communication between the access points $AP_0, AP_1$, $AP_2, AP_3$ is according to some aspects a backhaul communication via the corresponding backhaul channel $H_{10}, H_{21}$, $H_{32}$, and in the IAB network the backhaul communication and the access communication are both performed by means of a common equipment at the access points $AP_0, AP_1, AP_2$, $AP_3$. The second access point $AP_1$, the third access point $AP_2$ and the fourth access point $AP_3$ are wirelessly backhauled by the first access point $AP_0$ connecting to a core network 2 using a fiber connection 5.

In IAB networks, uplink (UL) and downlink (DL) transmission does not follow the common definition, as both endpoints of the backhaul links are access points. However, for simplicity, we refer to data transmission towards (resp. from) the first access point $AP_0$ as UL (resp. DL) transmission.

Considering FIG. 1, the discussions in the following example relate to UL transmission from the CPE:s $U_{31}, U_{32}$ served by the fourth access point $AP_3$, and generally the channel coefficients in the $U_{ij}-AP_k$ and $AP_i-AP_j$ links are represented by $H_{ij\_k}$ and $H_{ij}$, respectively. However, the same discussions can be applied for DL transmission as well.

The present disclosure has been described with examples related to time-division multiple access (TDMA). However, the same scheme can also be adapted for other resource allocation approaches such as for example frequency-division multiple access (FDMA) and code-division multiple access (CDMA).

As shown in FIG. 1, the group of CPE:s $U_{3j}, U_{3k}$ that is served by the fourth access point $AP_3$ comprises an overheard sub-group. The overheard sub-group comprises one or more CPE:s that have a fairly good channel to at least one overhearing AP, that is not the serving AP, where the channel to the overhearing AP is not good enough for it to be the serving access point for that CPE. In this example, the overheard sub-group is only constituted by the second CPE $U_{3k}$, and the overhearing AP is the second access point $AP_1$, where the second CPE $U_{3k}$ can communicate with the second access point $AP_1$ via an overheard access channel $h_{3k\_1}$.

The overhearing AP can generally be any AP except the serving AP. In the present example, if the overhearing AP is an AP with which the fourth access point $AP_3$ is adapted for direct backhaul communication, such as the third access point $AP_2$, there are no additional spectral resource that becomes available, for example for communication between the fourth access point $AP_3$ and the third access point $AP_2$.

Furthermore, the group of CPE:s $U_{3j}$, $U_{3k}$ that is served by the fourth access point $AP_3$ comprises an isolated sub-group. The isolated sub-group comprises one or more CPE:s that have a working channel to no other AP, except for their serving AP. In this example, the isolated sub-group is only constituted by the first CPE $U_{3j}$ that only can communicate with the fourth access point $AP_3$.

According to the present example, each access point, and at least the second access point $AP_1$, is adapted to perform channel measurements in order to determine the presence of overheard CPE:s such as the second CPE $U_{3k}$, via the overheard access channel $h_{3k\_1}$, were the second CPE $U_{3k}$ is adapted to normally communicate with a serving access point, here the fourth access point $AP_3$. According to some aspects, the channel measurements are performed offline.

The second access point $AP_1$ is adapted to communicate with neighboring access points in the wireless communication system 1, in this example the first access point $AP_0$ and the third access point $AP_2$, via a corresponding backhaul channel $H_{10}$, $H_{21}$. The second access point $AP_1$ is further adapted to receive communication from the overheard second CPE $U_{3k}$ via a corresponding overheard access channel $h_{3k\_1}$, where the overheard second CPE $U_{3k}$ is adapted to normally communicate with its serving fourth access point $AP_3$.

Figure 3:
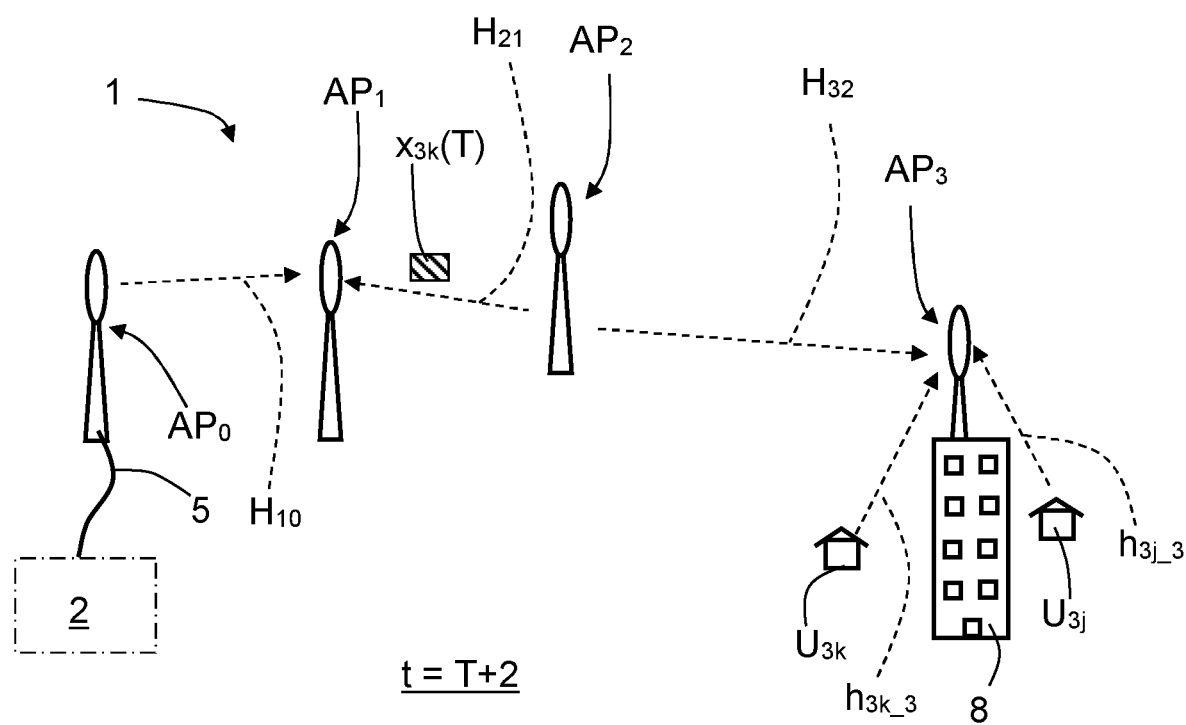
FIG. 3 schematically shows a view of a wireless communication system at a third time instant.

According to the present disclosure, with reference also to FIG. 3, the second access point $AP_1$ is adapted to instruct the overheard second CPE $U_{3k}$ to pause transmission to the serving fourth access point $AP_3$ at time instants T+2 when the second access point $AP_1$ is going to receive a certain signal $x_{3k}(T)$ from the neighboring third access point $AP_2$, where the certain signal $x_{3k}(T)$ is intended to be received by the second access point $AP_1$ without interference from the overheard second CPE $U_{3k}$ that has been instructed to pause transmission.

This means that since the overheard second CPE $U_{3k}$ pauses transmission to the serving fourth access point $AP_3$ at said time instants T+2, the second access point $AP_1$ does not receive communication from the overheard second CPE $U_{3k}$ via the overheard access channel $h_{3k\_1}$ at these time instants, and thus the overheard second CPE $U_{3k}$ does not produce interfering signals to the second access point $AP_1$. The serving fourth access point $AP_3$ can still receive signals from other suitable CPE:s such as the isolated first CPE $U_{3j}$ although the overheard second type node $U_{3k}$ pauses transmission.

According to some aspects, at a first time instant T that is illustrated in FIG. 1, the second access point $AP_1$ receives and buffer both a first signal $x_{3j}(T-2)$ from the third access point $AP_2$, and an overheard second signal $x_{3k}(T)$ from the overheard second CPE $U_{3k}$. At a future time instant T+2, the second access point $AP_1$ is adapted to receive and buffer the second signal $x_{3k}(T)$ from the neighboring the third access point $AP_2$. The second signal $x_{3k}(T)$ from the third access point $AP_2$ is intended to be received by the second access point $AP_1$ without interference from the overheard second CPE $U_{3k}$. The second access point $AP_1$ is further adapted to separate and decode the received and buffered signals $x_{3k}(T)$, $x_{3j}(T-2)$.

The second signal $x_{3k}(T)$ from the third access point $AP_2$ is received by the second access point $AP_1$ without interference from the overheard second CPE $U_{3k}$ since, at this time instant T+2, the overheard second CPE $U_{3k}$ is adapted to pause transmission to the serving fourth access point $AP_3$ and then also transmission to the second access point $AP_1$ via the overheard access channel $h_{3k\_1}$ is paused as well.

According to some aspects, the second access point $AP_1$ is adapted to separate and decode the received and buffered signals $x_{3k}(T)$, $x_{3j}(T-^2)$ by means of successive interference cancelling.

In the following, the present example will now be discussed more in detail, and it is to be understood that the analytical results can be extended to any applicable case, a similar approach being applicable for the cases with different numbers of hops, different lengths of the CPE:s' signals and different lengths in different hops. The analytical results are presented for the cases with single antennas, but the same discussions can be applied for the cases with multiple antennas. Some previously described features and steps will be repeated here in order to present a complete detailed discussion.

As the number of hops/CPEs per hop increases, the APs need to transfer an aggregated data of multiple CPE:s accumulated from the previous hops. As a result, the AP-AP backhaul links are heavily loaded which may lead to high decoding complexity/delay and buffering cost for the AP:s and large end-to-end transmission/scheduling delay and low end-to-end throughput for the CPE:s. Also, with a moderate/large number of hops and/or CPE:s her hop, the network interference increases which deteriorates the system performance. The present disclosure relates to an efficient CPE grouping technique, a joint scheduling method between different hops and adaptation of the decoding/buffering schemes to reduce the network interference and increase the end-to-end throughput.

The CPE:s associated with $AP_j$ are denoted by $U_{jn}$, n=1, ..., N, where N is the number of CPE:s allocated for each AP. The signal of $U_{jn}$ is presented by $x_{jn}$, $\forall i$, n. Considering a multi-hop network configuration, we concentrate on the UL transmission in, e.g., $U_{3k}$-$AP_3$- $AP_2$-$AP_1$- $AP_0$ route and pay special attention to the $U_{3k}$-$AP_3$- $AP_2$- $AP_1$ path. The discussions, however, can be extended to the cases with arbitrary number of hops, different network configurations and/or DL transmission.

IAB networks are of interest in, e.g., small cell backhaul and fixed wireless access (FWA) networks, with stationary AP:s/CPE:s. As a result, the AP-AP and AP-CPE links are static channels where the channels quality remain constant for a long time. Therefore, the data transmission scheme can be set with high accuracy for multiple packet transmissions.

In the following, an example will be provided, following seven steps. It is to be understood that some steps can be omitted or performed in a different manner as well understood by the skilled person.

In a first step, based on the channels qualities, each CPE is assigned to one AP which is the main node responsible for its data transmission. For instance, CPE:s $U_{ij}$, j=1, ..., N, are allocated to $AP_i$. In the present example, the first CPE $U_{3j}$ and the second CPE $U_{3k}$ are allocated to the fourth access point $AP_3$.

In a second step, depending on the quality of the channels to the neighbor AP(s), the CPE:s of each AP are divided into two sub-groups. The CPE:s that have fairly strong channels to neighbor AP:s, are divided into an overheard sub-group. On the other hand, the CPE:s that have good links only to their serving or master AP are categorized into an isolated sub-group. For instance, in the present example as shown in FIG. 1, the overheard sub-group is only constituted by the second CPE $U_{3k}$, and the overhearing AP is the second access point $AP_1$, where the second CPE $U_{3k}$ can communicate with the second access point $AP_1$ via an overheard access channel $h_{3k\_1}$. The isolated subgroup is only constituted by the first CPE $U_{3j}$, that has a good link only to the fourth access point $AP_3$.

Then, the scheduling in different hops is adapted jointly based on the considered sub-groups. Particularly, one overheard CPE is paired with an isolated CPE, in the sense that their data transmissions are synchronized. For instance, in FIG. 1, among the CPEs of the fourth access point $AP_3$, the overheard second CPE $U_{3k}$ and the isolated first CPE $U_{3j}$ are paired.

In a third step, based on the channels' qualities and the selected pair, the transmission parameters, e.g., rates and powers, of the paired CPE:s are set correspondingly. How to set the transmission rates is explained in a following seventh step. Note that the first three steps are performed off-line based on the long-term channel conditions, e.g., distances and line-of-sight (LOS) signal power, and before the data transmission starts.

In a fourth step, at the first time instant T as shown in FIG. 1, the third access point $AP_2$ forwards the first signal $x_{3j}(T-2)$ to the second access point $AP_1$ and simultaneously the second CPE CPE $U_{3k}$ sends the second signal $x_{3k}(T)$ to the fourth access point $AP_3$ which receives and buffers the second signal $x_{3k}(T)$. Thus, the second access point $AP_1$ receives the interference-affected signal $Y=\sqrt{P_2}h_{21}x_{3j}(T-2)+\sqrt{P_{3k}}\tilde{h}_{3k\_1}x_{3k}(T)+Z(T)$ and buffers it without message decoding. Here, Z(T) represents the additive noise of the second access point $AP_1$, $h_{ij}$ is the channel between $AP_i$ and $AP_j$, and $\tilde{h}_{ij\_k}$ denotes the channel between CPE $U_{ij}$ and $AP_k$. Also, $P_i$ and $P_{ij}$ are the transmission powers of $AP_i$ and CPE $U_{ij}$, respectively.

Figure 2:
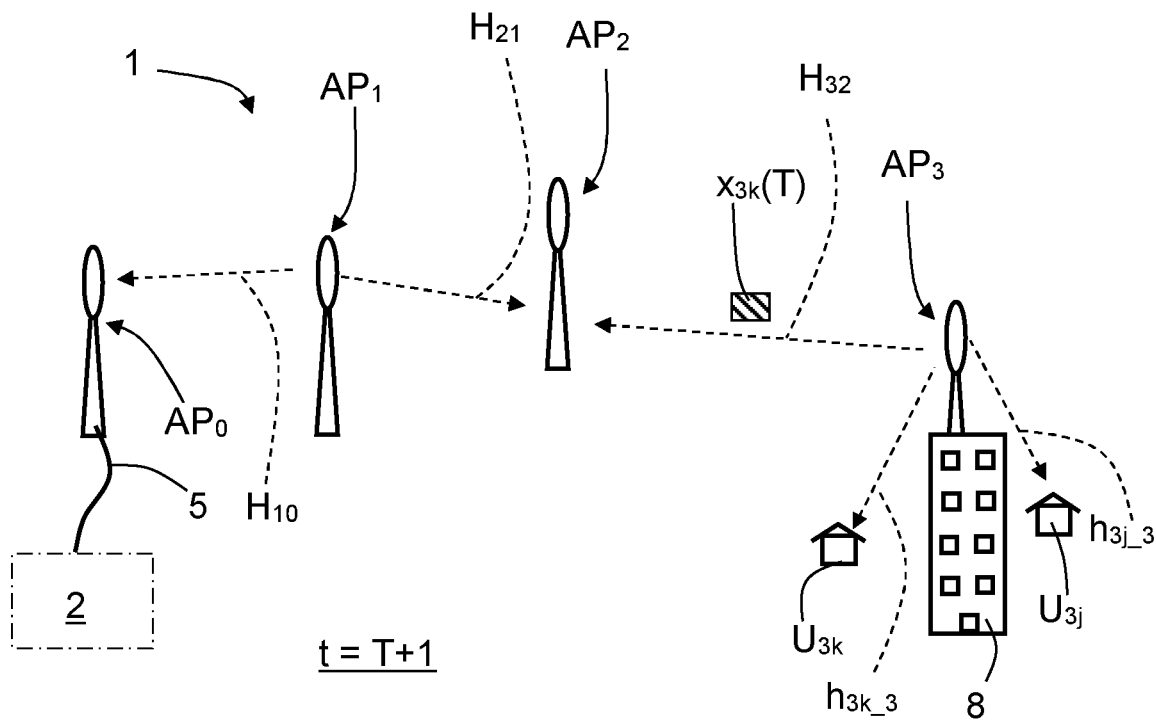
FIG. 2 schematically shows a view of a wireless communication system at a second time instant.

In a fifth step, at a second time T+1 as shown in FIG. 2, the AP:s switch their transmission/reception mode and the fourth access point $AP_3$ forwards the second signal $x_{3k}(T)$ to the third access point $AP_2$ which decodes and buffers the signal.

In a sixth step, at a third time instant T+2 as shown in FIG. 3, the second CPE $U_{3j}$ sends the first signal $x_{3j}(T+2)$ to the fourth access point $AP_3$ and, at the same time, the third access point $AP_2$ forwards the second signal $x_{3k}(T)$ to the second access point $AP_1$.

In a seventh step, receiving the interference-free signal $Y=\sqrt{P_2}h_{21}x_{3k}(T)+Z(T+2)$ at the third time instant T+2, the second access point $AP_1$ uses successive interference cancellation (SIC)-based receiver to decode both the second signal $x_{3k}(T)$ and the first signal $x_{3j}(T-2)$. First, maximum ratio combining (MRC) is used by the second access point $AP_1$ to decode the second signal $x_{3k}(T)$ based on the two interference-affected and interference-free copies of the signal received at the first time instant T and the third time instant T+2, respectively. Then, successfully decoding the second signal $x_{3k}(T)$, the second access point $AP_1$ first removes the term $\sqrt{P_{3k}}\tilde{h}_{3k\_1}x_{3k}(T)$ from $Y=\sqrt{P_2}h_{21}x_{3j}(T-2)+\sqrt{P_{3k}}\tilde{h}_{3k\_1}x_{3k}(T)+Z(T)$ and then decodes $x_{3j}(T-2)$ interference-free. In this way, the achievable rates of these CPE:s are given by $$\begin{cases} R_{3k} = \log\left(1 + P_2 g_{21} + \dfrac{P_{3k}\tilde{g}_{3k\_1}}{1+P_2 g_{21}}\right) & (1.i) \\ R_{3j} = \log(1 + P_2 g_{21}) & (1.ii) \end{cases}$$

where $\tilde{g}_{ij\_k}=|\tilde{h}_{ij\_k}|^2$ and $g_{ij}=|h_{ij}|^2$ are defined, and the additive noise is normalized to have unit variance. Also, (1.i) is based on the MRC-based combining of the interference-free and interference-affected signals of the second signal $x_{3k}(T)$.

Then, (1.ii) comes from the fact that, with SIC-based receiver, the message of $x_{3j}(T-2)$ is decoded interference-free.

In this way, the achievable rate of the CPE:s increases because with proper CPE scheduling based on the considered sub-groups, synchronization of the signals, and adaptation of the decoding and buffering schemes, the overheard signal, constituting an interfering signal, is changed to a useful message improving the system performance. As a result, the end-to-end throughput increases, and the buffer requirement decreases correspondingly.

To simplify the discussions, it has in this example been assumed that the bottleneck of the system performance is in the link between the second access point $AP_1$ and the third access point $AP_2$ which is experiencing the lowest channel quality. The present disclosure, however, can be extended to the cases with different channel qualities of the links.

Considering the present disclosure as disclosed above, the following points are interesting to note:
1) The present disclosure has been presented for uncomplicated cases with one isolated CPE $U_{3j}$ and one overheard CPE $U_{3k}$ in a multi-hop setup. However, the same approach can be applied for the cases with arbitrary number of CPE:s and network configurations. Also, while the present disclosure has been described for a setup for cases with UL transmission, the same technique is applicable for DL transmission as well.
2) The CPE pairing and adapting the scheduling based on the considered sub-groups are determined offline, based on the network topology, and the CPE:s are adapted to determine their timing advance before the data transmission starts. Then, based on the scheduling, the AP:s and CPE:s switch immediately to the pre-configured data transmission and decoding scheme. The pairing is important for synchronizing their data transmissions.

According to some aspects, the communication between all first type nodes $AP_0$, $AP_1$, $AP_2$, $AP_3$ is a backhaul communication via at least one corresponding backhaul channel $H_{10}$, $H_{21}$, $H_{32}$, and where at least one first type node $AP_3$ is adapted to communicate with a corresponding group of second type nodes $U_{3k}$, $U_{3j}$ via a corresponding access channel $h_{3k\_3}$, $h_{3k\_j}$, where the backhaul communication and the access communication both are performed by means of common equipment at each one of the first type nodes $AP_0$, $AP_1$, $AP_2$, $AP_3$.

Important and innovative parts of the application are:
1) pausing transmission of an overheard CPE, enabling an AP to receive an interference-free transmission from a neighboring AP,
2) the CPE pairing scheme,
3) the joint scheduling approach based on the considered sub-groups, and
4) the developed transmission, decoding and buffering schemes of the CPE:s and AP:s.

The present disclosure addresses a problem related to IAB networks having overloaded AP-AP backhaul links as well as interference mitigation.

The time instants T, T+1, T+2, T+3 can according to some aspects be regarded as time slots.

An efficient data transmission technique for IAB networks is disclosed in accordance with the present disclosure where the effect of network interference is reduced and the achievable rate of the backhauling AP-AP links transferring an aggregated data of multiple CPE:s is increased. These goals are achieved by partitioning the CPE:s of each AP into different sub-groups and developing a joint scheduling scheme based on the considered sub-groups. Depending on the CPE:s' positions, the CPE:s are clustered to different groups and sub-groups. Then, the scheduling rule in different hops is adapted jointly and the considered sub-groups are based such that the data transmission of a CPE of a sub-group in a hop is scheduled in the same time as the data transmission of a CPE of another sub-group in a neighbor hop.

Adaption of scheduling rules are according to some aspects performed offline.

Also, depending on the considered CPE pairing approach, the decoding and the buffering approaches of the AP:s are adapted correspondingly. In this way, the interference does not deteriorate the system performance but, instead, it is utilized to improve the links achievable rates. This leads to higher throughput.

The present disclosure is applicable for both frequency division duplex (FDD) and time division duplex (TDD) schemes as well as for both uplink (UL) and downlink (DL) transmission. Also, while the present disclosure has presented for an uncomplicated case with three hops in a multi-hop scenario, the present disclosure can be easily extended to the cases with arbitrary number of hops and/or different network configurations.

Using the described CPE pairing scheme, joint scheduling in neighbor hops based on the considered sub-groups as well as adapting the decoding and buffering schemes of the APs increase the achievable rate of the AP-AP backhaul links and reduce the backhauling load significantly. Particularly, instead of deteriorating the system performance by interference, it is utilized to improve the backhauling rate. This leads to higher throughput in the IAB networks and may give the chance to increase the number of hops and/or the number of CPEs per hop.

Depending on the CPE:s' positions and if they have strong interfering links to the neighbor nodes, they may be divided into different groups and sub-groups as discussed above. Then, the scheduling in neighbor hops are designed jointly based on the considered sub-groups. Particularly, the transmission of the signals of the CPE:s of different sub-groups in different hops are synchronized properly and the message decoding scheme of the AP:s is adapted correspondingly. In this way, the overheard interfering signals do not deteriorate the system performance but, instead, are utilized to improve the system performance. Consequently, the achievable rate of the links increases which leads to higher end-to-end throughput.

Figure 4:
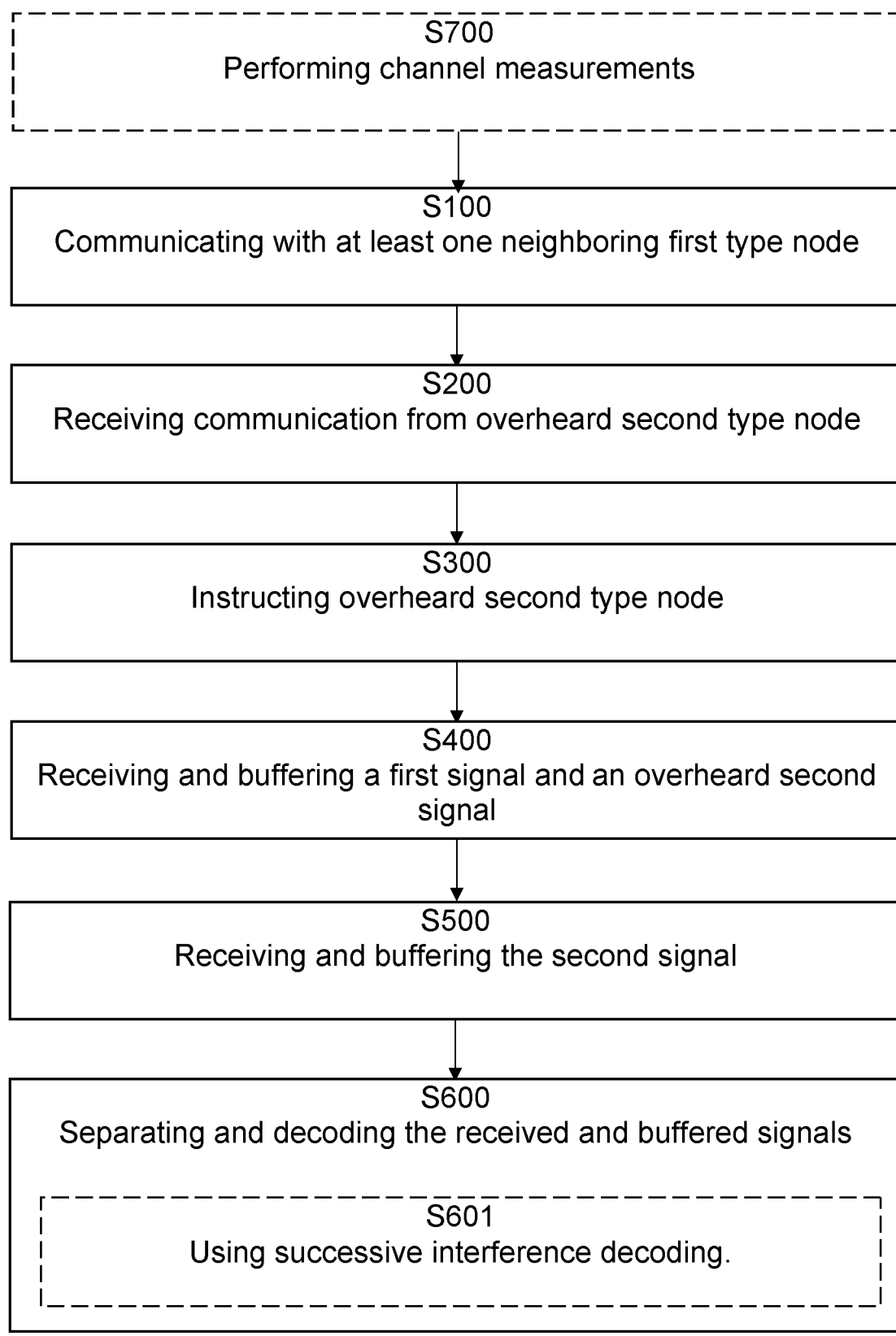
FIG. 4 shows a flowchart of methods in a first type node according to embodiments.

With reference to FIG. 4, the present disclosure also relates to a method in a first type node $AP_1$ in a wireless communication system 1, wherein the method comprises communicating S100 with at least one neighboring first type node $AP_0$, $AP_2$ in the wireless communication system 1 via a corresponding backhaul channel $H_{10}$, $H_{21}$ and receiving S200 communication from at least one overheard second type node $U_{3k}$ via a corresponding overheard access channel $h_{3k\_1}$, the overheard second type node $U_{3k}$ being adapted to normally communicate with a serving first type node $AP_3$; The method further comprises instructing S300 at least one overheard second type node $U_{3k}$ to pause transmission to the serving first type node $AP_3$ at time instants T+2 when the first type node $AP_1$ is going to receive a certain signal $x_{3k}(T)$ from the neighboring first type node $AP_2$. The certain signal $x_{3k}(T)$ is intended to be received by the first type node $AP_1$ without interference from said overheard second type node $U_{3k}$ that has been instructed to pause transmission.

According to some aspects, the method comprises performing S700 channel measurements in order to determine the presence of overheard second type nodes $U_{3k}$ as well as isolated second type nodes $U_{3j}$, where an overheard second type node $U_{3k}$ is able to communicate with the serving first type node $AP_3$, and to communicate with the first type node $AP_1$ that is separate from the serving first type node $AP_3$, and where an isolated second type node $U_{3j}$ is able to communicate with the serving first type node $AP_3$ only.

According to some aspects, the method comprises, at a first time instant T, receiving and buffering S400 both a first signal $x_{3j}(T-2)$ from a neighboring first type node $AP_2$ and an overheard second signal $x_{3k}(T)$ from the overheard second type node $U_{3k}$. The method further comprises, at a future time instant T+2, receiving and buffering S500 the second signal $x_{3k}(T)$ from the neighboring first type node $AP_2$, the second signal $x_{3k}(T)$ from the neighboring first type node $AP_2$ being intended to be received by the first type node $AP_1$ without interference from said overheard second type node $U_{3k}$, and separating and decoding S600 the received and buffered signals $x_{3k}(T)$, $x_{3j}(T-2)$.

According to some aspects, the separating and decoding S600 of the received and buffered signals $x_{3k}(T)$, $x_{3j}(T-^2)$ comprises using S601 successive interference cancelling.

According to some aspects, the communication between all first type nodes $AP_0$, $AP_1$, $AP_2$, $AP_3$ is a backhaul communication via at least one corresponding backhaul channel $H_{10}$, $H_{21}$, $H_{32}$, and where at least one first type node $AP_3$ is adapted to communicate with a corresponding group of second type nodes $U_{3k}$, $U_{3j}$ via a corresponding access channel $h_{3k\_3}$, $h_{3j\_3}$, where the backhaul communication and the access communication both are performed by means of common equipment at each one of the first type nodes $AP_0$, $AP_1$, $AP_2$, $AP_3$.

Figure 5:
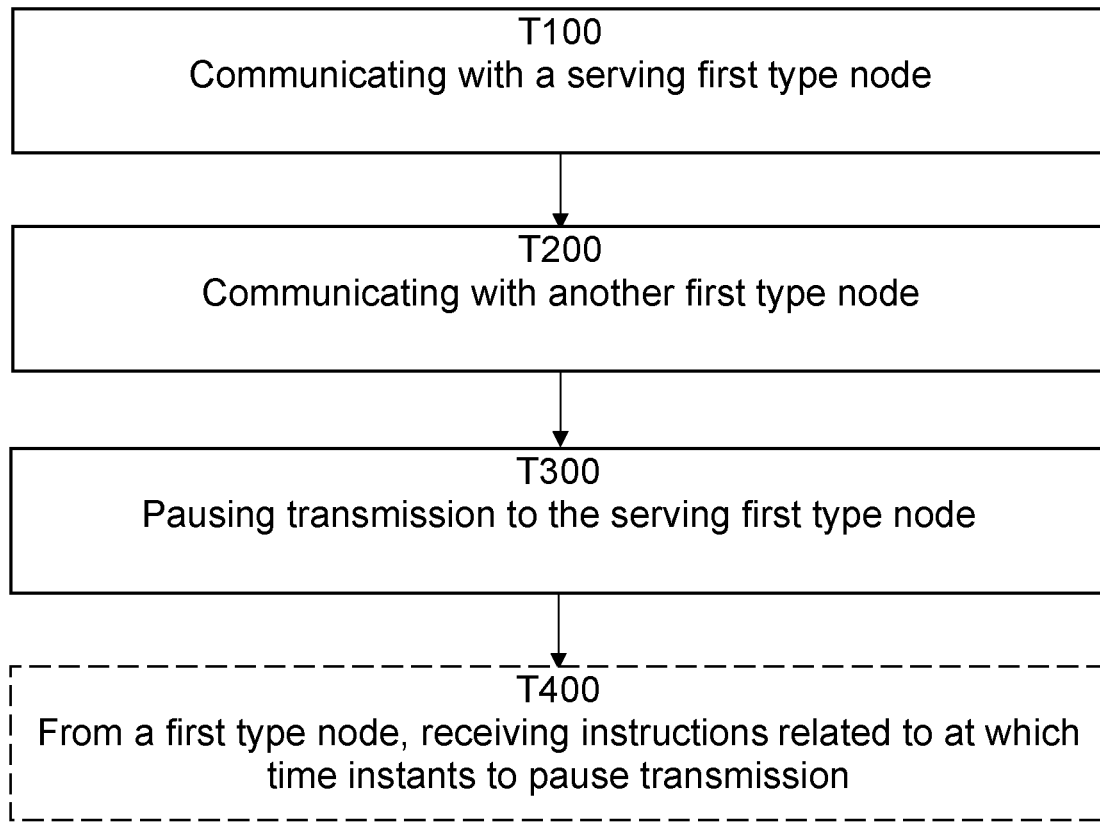
FIG. 5 shows a flowchart of methods in a second type node according to embodiments.

With reference to FIG. 5, the present disclosure also relates to a method in an overheard second type node $U_{3k}$ in a wireless communication system 1, wherein the method comprises communicating T100 with a serving first type node $AP_3$ in the wireless communication system 1 via a corresponding access channel $h_{3k\_3}$, and communicating T200 with another first type node $AP_1$ in the wireless communication system 1 via a corresponding overheard access channel $h_{3k\_1}$.

The method further comprises pausing P300 transmission to the serving first type node $AP_3$ at time instants T+2 when the other first type node $AP_1$ is going to receive a certain signal $x_{3k}(T)$ from a neighboring first type node $AP_2$, where the certain signal $x_{3k}(T)$ is intended to be received by the other first type node $AP_1$ without interference from the overheard second type node $U_{3k}$ that has been instructed to pause transmission.

It should be noted that the communicating T200 with another first type node $AP_1$ in the wireless communication system 1 via a corresponding overheard access channel $h_{3k\_1}$ is due to overhearing, and is normally an unintentional type of communication that can cause undesired interference. Furthermore, the serving fourth access point $AP_3$ can still receive signals from other suitable CPE:s such as the isolated first CPE $U_{3j}$ although the overheard second type node $U_{3k}$ pauses transmission.

According to some aspects, the method comprises receiving T400 instructions from the serving first type node $AP_3$ or the other first type node $AP_1$, where the instructions relate to at which time instants to pause transmission to the serving first type node $AP_3$.

Figure 6:
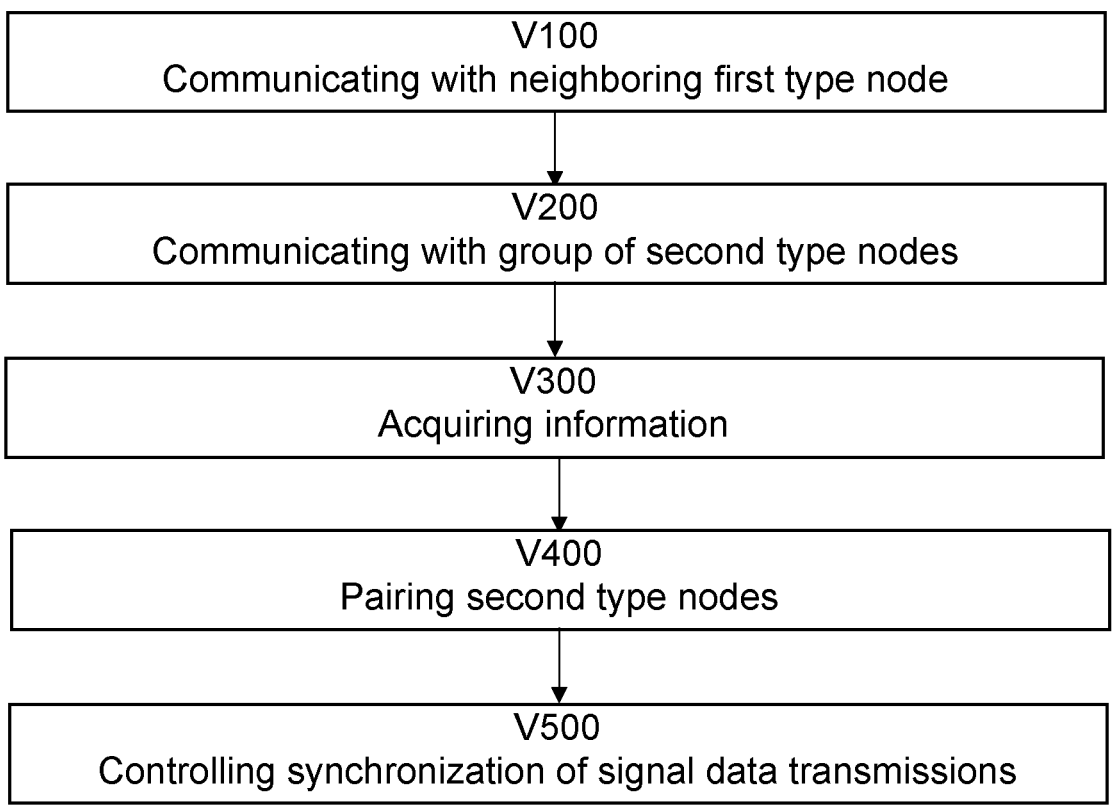
FIG. 6 shows a flowchart of methods in a first type node according to embodiments.

With reference to FIG. 6, the present disclosure also relates to a method in a first type node $AP_3$ in a wireless communication system 1, where the method comprises communicating V100 with at least one neighboring first type node $AP_2$ in the wireless communication system 1 via a corresponding backhaul channel $H_{32}$, and communicating V200 with a corresponding group of second type nodes $U_{3k}$, $U_{3j}$ via a corresponding access channel $h_{3k}$, $h_{3j}$. The method further comprises acquiring (V300) information regarding the presence of overheard second type nodes $U_{3k}$ and isolated second type nodes $U_{3j}$. An overheard second type node $U_{3k}$ is able to communicate with the first type node $AP_3$ and to communicate with a remote first type node $AP_1$ that is separate from the first type node $AP_3$. An isolated second type node $U_{3j}$ is able to communicate with the first type node $AP_3$ only.

According to some aspects, the acquired information is provided by a remote first type node $AP_1$.

According to some aspects, the method further comprises pairing V400 one overheard second type node $U_{3k}$ with one isolated second type node $U_{3j}$, and controlling V500 synchronization of signal data transmissions of the paired second type nodes $U_{3j}$, $U_{3k}$.

Figure 7:
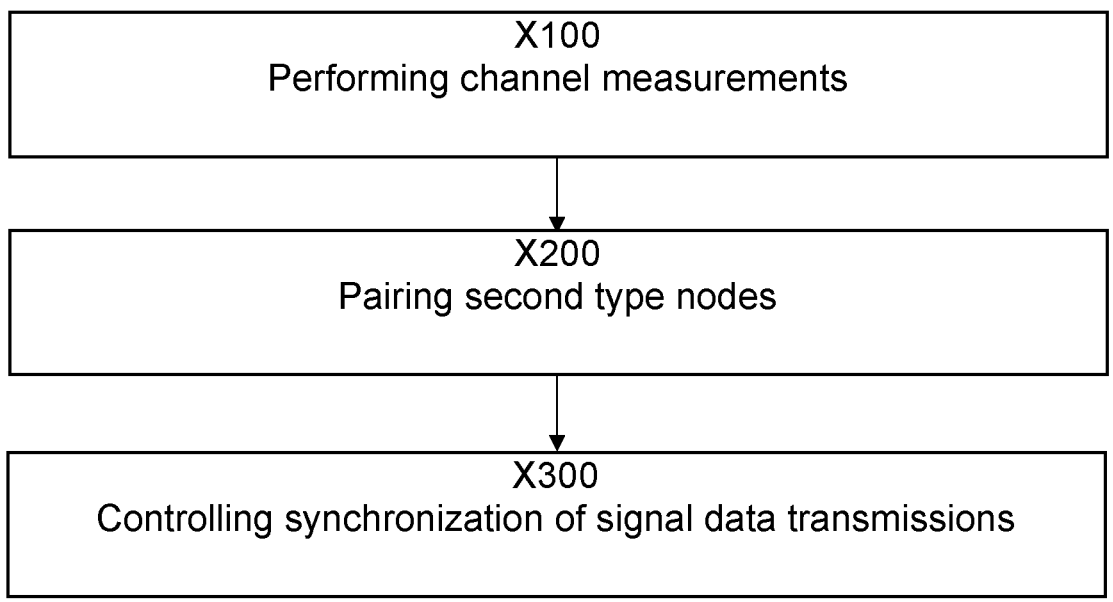
FIG. 7 shows a flowchart of methods in a communication system according to embodiments.

With reference to FIG. 7, the present disclosure also relates to a method in a wireless communication system 1, comprising first type nodes $AP_0$, $AP_1$, $AP_2$, $AP_3$ and second type nodes $U_{3k}$, $U_{3j}$, where the communication between all first type nodes $AP_0$, $AP_1$, $AP_2$, $AP_3$ is a backhaul communication via at least one corresponding backhaul channel $H_{10}$, $H_{21}$, $H_{32}$. At least one first type node $AP_3$ is adapted to communicate with a corresponding group of second type nodes $U_{3k}$, $U_{3j}$ via a corresponding access channel $h_{3k\_3}$, $h_{3j\_3}$, where the backhaul communication and the access communication both are performed by means of common equipment at each one of the first type nodes $AP_0$, $AP_1$, $AP_2$, $AP_3$.

The method comprises performing X100 channel measurements in order to determine the presence of overheard second type nodes $U_{3k}$ and isolated second type nodes $U_{3j}$, where an overheard second type node $U_{3k}$ is able to communicate with its serving first type node $AP_3$ and to communicate with a remote first type node $AP_1$ that is separate from its serving first type node $AP_3$ and an isolated second type node $U_{3j}$ is able to communicate with its serving first type node $AP_3$ only. The method further comprises pairing X200 one overheard second type node $U_{3k}$ with one isolated second type node $U_{3j}$, and controlling X300 synchronization of signal data transmissions of the paired second type nodes $U_{3j}$, $U_{3k}$.

Figure 8A:
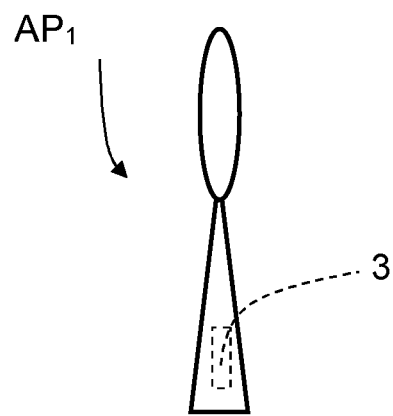
FIG. 8A schematically shows a first type node.

As shown in FIG. 8A, according to some aspects, a node $AP_1$ in a wireless communication system 1 comprises a processor unit 3 that is adapted to control communication with at least one neighboring first type node $AP_0$, $AP_2$ in the wireless communication system 1 via a corresponding backhaul channel $H_{10}$, $H_{21}$, and to control reception of communication from at least one overheard second type node $U_{3k}$ via a corresponding overheard access channel $h_{3k\_1}$, the overheard second type node $U_{3k}$ being adapted to normally communicate with a serving first type node $AP_3$. The processor unit 3 is further adapted to instruct at least one overheard second type node $U_{3k}$ to pause transmission to the serving first type node $AP_3$ at time instants T+2 when the first type node $AP_1$ is going to receive a certain signal $x_{3k}(T)$ from the neighboring first type node $AP_2$. The certain signal $x_{3k}(T)$ is intended to be received by the first type node $AP_1$ without interference from said overheard second type node $U_{3k}$ that has been instructed to pause transmission.

According to some aspects, the processor unit 3 is adapted to, at a first time instant T, control reception and buffering of both a first signal $x_{3j}(T-2)$ from a neighboring first type node $AP_2$ and an overheard second signal $x_{3k}(T)$ from the overheard second type node $U_{3k}$. The processor unit 3 is further adapted to, at a future time instant T+2, to control reception and buffering of the second signal $x_{3k}(T)$ from the neighboring first type node $AP_2$, the second signal $x_{3k}(T)$ from the neighboring first type node $AP_2$ being intended to be received by the first type node $AP_1$ without interference from said overheard second type node $U_{3k}$, and to control separation and decoding of the received and buffered signals $x_{3k}(T)$, $x_{3j}(T-2)$.

Figure 8B:
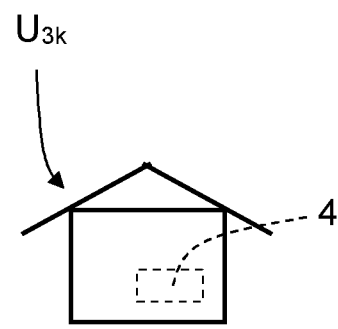
FIG. 8B schematically shows a second type node.

As shown in FIG. 8B, according to some aspects, an overheard second type node $U_{3k}$ in a wireless communication system 1 comprises a processor unit 4 that is adapted to control communication with a serving first type node $AP_3$ in the wireless communication system 1 via a corresponding access channel $h_{3k\_3}$, where the communication results in an overheard communication with another first type node $AP_1$ in the wireless communication system 1 via a corresponding overheard access channel $h_{3k\_1}$. The processor unit 4 is adapted to control pausing of transmission to the serving first type node $AP_3$ at time instants T+2 when the other first type node $AP_1$ is going to receive a certain signal $x_{3k}(T)$ from a neighboring first type node $AP_2$, where the certain signal $x_{3k}(T)$ is intended to be received by the other first type node $AP_1$ without interference from the overheard second type node $U_{3k}$.

The present disclosure is not limited to the above, but may vary freely within the scope of the appended claims. For example, the present disclosure is applicable for both frequency division duplex (FDD) and time division duplex (TDD) schemes, different HARQ protocols as well as for both uplink (UL) and downlink (DL) transmission.

According to some aspects, the present disclosure can easily extended to the cases with arbitrary number of hops, different relaying approaches or star-like network configuration.

Successive interference cancellation and maximum ratio combining are only examples of methods for decoding, removing interference and identifying received signals. Many other such methods are well-known to the skilled person.

Generally, the present disclosure relates to a first type node $AP_1$ in a wireless communication system 1, wherein the first type node $AP_1$ is adapted to communicate with at least one neighboring first type node $AP_0$, $AP_2$ in the wireless communication system 1 via a corresponding backhaul channel $H_{10}$, $H_{21}$ and to receive communication from at least one overheard second type node $U_{3k}$ via a corresponding overheard access channel $h_{3k\_1}$. The overheard second type node $U_{3k}$ is adapted to normally communicate with a serving first type node $AP_3$. The overheard second type node $U_{3k}$ is further adapted to instruct at least one overheard second type node $U_{3k}$ to pause transmission to the serving first type node $AP_3$ at time instants T+2 when the first type node $AP_1$ is going to receive a certain signal $x_{3k}(T)$ from the neighboring first type node $AP_2$. The certain signal $x_{3k}(T)$ is intended to be received by the first type node $AP_1$ without interference from said overheard second type node $U_{3k}$ that has been instructed to pause transmission.

According to some aspects, the first type node $AP_1$ is adapted to perform channel measurements in order to determine the presence of overheard second type nodes $U_{3k}$ and isolated second type nodes $U_{3j}$, where an overheard second type node $U_{3k}$ is able to communicate with the serving first type node $AP_3$, and to communicate with the first type node $AP_1$ that is separate from the serving first type node $AP_3$, and where an isolated second type node $U_{3j}$ is able to communicate with its serving first type node $AP_3$ only.

According to some aspects, the first type node $AP_1$ is adapted, at a first time instant T, to receive and buffer both a first signal $x_{3j}(T-2)$ from a neighboring first type node $AP_2$ and an overheard second signal $x_{3k}(T)$ from the overheard second type node $U_{3k}$, and, at a future time instant T+2, to receive and buffer the second signal $x_{3k}(T)$ from the neighboring first type node $AP_2$. The second signal $x_{3k}(T)$ from the neighboring first type node $AP_2$ is intended to be received by the first type node $AP_1$ without interference from said overheard second type node $U_{3k}$. The first type node $AP_1$ is further adapted to separate and decode the received and buffered signals $x_{3k}(T)$, $x_{3j}(T-2)$.

According to some aspects, the first type node $AP_1$ is adapted to separate and decode the received and buffered signals $x_{3k}(T)$, $x_{3j}(T-2)$ by means of successive interference cancelling. According to some aspects, the communication between all first type nodes $AP_0$, $AP_1$, $AP_2$, $AP_3$ is a backhaul communication via at least one corresponding backhaul channel $H_{10}$, $H_{21}$, $H_{32}$, and at least one first type node $AP_3$ is adapted to communicate with a corresponding group of second type nodes $U_{3k}$, $U_{3j}$ via a corresponding access channel $h_{3k\_3}$, $h_{3j\_3}$. The backhaul communication and the access communication are both performed by means of common equipment at each one of the first type nodes $AP_0$, $AP_1$, $AP_2$, $AP_3$.

Generally, the present disclosure relates to a an overheard second type node $U_{3k}$, where the overheard second type node $U_{3k}$ is adapted to communicate with a serving first type node $AP_3$ in the wireless communication system 1 via a corresponding access channel $h_{3k\_3}$, and to communicate with another first type node $AP_1$ in the wireless communication system 1 via a corresponding overheard access channel $h_{3k\_1}$. The overheard second type node $U_{3k}$ is adapted to pause transmission to the serving first type node $AP_3$ at time instants T+2 when the other first type node $AP_1$ is going to receive a certain signal $x_{3k}(T)$ from a neighboring first type node $AP_2$, where the certain signal $x_{3k}(T)$ is intended to be received by the other first type node $AP_1$ without interference from the overheard second type node $U_{3k}$.

According to some aspects, the overheard second type node $U_{3k}$ is adapted to receive instructions from the serving first type node $AP_3$ or the other first type node $AP_1$, where the instructions relate to at which time instants to pause transmission to the serving first type node $AP_3$.

Generally, the present disclosure relates to a first type node $AP_3$, where the first type node $AP_3$ is adapted to communicate with at least one neighboring first type node $AP_2$ in the wireless communication system 1 via a corresponding backhaul channel $H_{32}$; and to communicate with a corresponding group of second type nodes $U_{3k}$, $U_{3j}$ via a corresponding access channel $h_{3k}$, $h_{3j}$.

The first type node $AP_3$ is further adapted to acquire information regarding the presence of overheard second type nodes $U_{3k}$ and isolated second type nodes $U_{3j}$, where an overheard second type node $U_{3k}$ is able to communicate with the first type node $AP_3$ and to communicate with a remote first type node $AP_1$ that is separate from the first type node $AP_3$. An isolated second type node $U_{3j}$ is able to communicate with the first type node $AP_3$ only.

According to some aspects, the first type node $AP_3$ is adapted to pair one overheard second type node $U_{3k}$ with one isolated second type node $U_{3j}$, and to control synchronization of signal data transmissions of the paired second type nodes $U_{3j}$, $U_{3k}$.

Generally, the present disclosure relates to a wireless communication system 1, comprising first type nodes $AP_0$, $AP_1$, $AP_2$, $AP_3$ and second type nodes $U_{3k}$, $U_{3j}$, where the communication between all first type nodes $AP_0$, $AP_1$, $AP_2$, $AP_3$ is a backhaul communication via at least one corresponding backhaul channel $H_{10}$, $H_{21}$, $H_{32}$, and where at least one first type node $AP_3$ is adapted to communicate with a corresponding group of second type nodes $U_{3k}$, $U_{3j}$ via a corresponding access channel $h_{3k\_3}$, $h_{3j\_3}$. The backhaul communication and the access communication are both performed by means of common equipment at each one of the first type nodes $AP_0$, $AP_1$, $AP_2$, $AP_3$. The communication system 1 is adapted to perform channel measurements in order to determine the presence of overheard second type nodes $U_{3k}$ and isolated second type nodes $U_{3j}$, where an overheard second type node $U_{3k}$ is able to communicate with its serving first type node $AP_3$ and to communicate with a remote first type node $AP_1$ that is separate from its serving first type node $AP_3$. An isolated second type node $U_{3j}$ is able to communicate with its serving first type node $AP_3$ only.

According to some aspects, the communication system 1 is adapted to pair one overheard second type node $U_{3k}$ with one isolated second type node $U_{3j}$, and to control synchronization of signal data transmissions of the paired second type nodes $U_{3j}$, $U_{3k}$.

The invention claimed is:

1. A first type node ($AP_1$) in a wireless communication system, wherein the first type node ($AP_1$) is adapted to:
    communicate with at least one neighboring first type node ($AP_0$, $AP_2$) in the wireless communication system via a corresponding backhaul channel ($H_{10}$, $H_{21}$);
    receive communication from at least one overheard second type node ($U_{3k}$) via a corresponding overheard access channel ($h_{3k\_1}$), the overheard second type node ($U_{3k}$) being adapted to normally communicate with a serving first type node ($AP_3$);
    instruct at least one overheard second type node ($U_{3k}$) to pause transmission to the serving first type node ($AP_3$) at time instants (T+2) when the first type node ($AP_1$) is going to receive a certain signal ($X_{3k}(T)$) from the neighboring first type node ($AP_2$), where the certain signal ($X_{3k}(T)$) is intended to be received by the first type node ($AP_1$) without interference from said overheard second type node ($U_{3k}$) that has been instructed to pause transmission.

2. The first type node ($AP_1$) according to claim 1, wherein the first type node ($AP_1$) is adapted to perform channel measurements in order to determine the presence of overheard second type nodes ($U_{3k}$) and isolated second type nodes ($U_{3j}$), where an overheard second type node ($U_{3k}$) is able to communicate with the serving first type node ($AP_3$), and to communicate with the first type node ($AP_1$) that is separate from the serving first type node ($AP_3$), and where an isolated second type node ($U_{3j}$) is able to communicate with its serving first type node ($AP_3$) only.

3. The first type node ($AP_1$) according to claim 1, wherein the first type node ($AP_1$) is adapted:
    at a first time instant (T), to receive and buffer both a first signal ($x_{3j}(T-2)$) from a neighboring first type node ($AP_2$) and an overheard second signal ($X_{3k}(T)$) from the overheard second type node ($U_{3k}$);
    at a future time instant (T+2), to receive and buffer the second signal ($X_{3k}(T)$) from the neighboring first type node ($AP_2$), the second signal ($X_{3k}(T)$) from the neighboring first type node ($AP_2$) being intended to be received by the first type node ($AP_1$) without interference from said overheard second type node ($U_{3k}$); and
    to separate and decode the received and buffered signals ($X_{3k}(T)$, $X_{3j}(T-2)$).

4. The first type node ($AP_1$) according to claim 3, wherein the first type node ($AP_1$) is adapted to separate and decode the received and buffered signals ($X_{3K}(T)$, $X_{3j}(T-2)$) by means of successive interference cancelling.

5. The first type node (AP1) according to claim 1, wherein the communication between all first type nodes ($AP_0$, $AP_1$, $AP_2$, $AP_3$) is a backhaul communication via at least one corresponding backhaul channel ($H_{10}$, $H_{21}$, $H_{32}$), and where at least one first type node ($AP_3$) is adapted to communicate with a corresponding group of second type nodes ($U_{3k}$, $U_{3j}$) via a corresponding access channel ($h_{3k\_3}$, $h_{3j\_3}$), where the backhaul communication and the access communication both are performed by means of common equipment at each one of the first type nodes ($AP_0$, $AP_1$, $AP_2$, $AP_3$).

6. An overheard second type node ($U_{3k}$) in a wireless communication system, wherein the overheard second type node ($U_{3k}$) is adapted to communicate with a serving first type node ($AP_3$) in the wireless communication system via a corresponding access channel ($h_{3k\_3}$), and to communicate with another first type node ($AP_1$) in the wireless communication system via a corresponding overheard access channel ($h_{3k\_1}$), where the overheard second type node ($U_{3k}$) is adapted to pause transmission to the serving first type node ($AP_3$) at time instants (T+2) when the other first type node ($AP_1$) is going to receive a certain signal ($X_{3K}(T)$) from a neighboring first type node ($AP_2$), where the certain signal ($X_{3K}(T)$) is intended to be received by the other first type node ($AP_1$) without interference from the overheard second type node ($U_{3k}$).

7. The overheard second type node ($U_{3k}$) according to claim 6, where the overheard second type node ($U_{3k}$) is adapted to receive instructions from the serving first type node ($AP_3$) or the other first type node ($AP_1$), where the instructions relate to at which time instants to pause transmission to the serving first type node ($AP_3$).

8. A first type node ($AP_3$) in a wireless communication system, wherein the first type node ($AP_3$) is adapted to:
communicate with at least one neighboring first type node ($AP_2$) in the wireless communication system via a corresponding backhaul channel ($H_{32}$); and to
communicate with a corresponding group of second type nodes ($U_{3k}$, $U_{3j}$) via a corresponding access channel ($h_{3k}$, $h_{3j}$); wherein the first type node ($AP_3$) is adapted to:
acquire information regarding the presence of overheard second type nodes ($U_{3k}$) and isolated second type nodes ($U_{3j}$), where an overheard second type node ($U_{3k}$) is able to communicate with the first type node ($AP_3$) and to communicate with a remote first type node ($AP_1$) that is separate from the first type node ($AP_3$), and where an isolated second type node ($U_{3j}$) is able to communicate with the first type node ($AP_3$) only.

9. The first type node ($AP_3$) according to claim 8, wherein the first type node ($AP_3$) is adapted to pair one overheard second type node ($U_{3k}$) with one isolated second type node ($U_{3j}$), and to control synchronization of signal data transmissions of the paired second type nodes ($U_{3j}$, $U_{3k}$).

10. A method in a first type node ($AP_1$) in a wireless communication system, wherein the method comprises:
communicating with at least one neighboring first type node ($AP_0$, $AP_2$) in the wireless communication system via a corresponding backhaul channel ($H_{10}$, $H_{21}$);
receiving communication from at least one overheard second type node ($U_3$k) via a corresponding overheard access channel ($h_{3k\_1}$), the overheard second type node ($U_{3k}$) being adapted to normally communicate with a serving first type node ($AP_3$);
instructing at least one overheard second type node ($U_{3k}$) to pause transmission to the serving first type node ($AP_3$) at time instants (T+2) when the first type node ($AP_1$) is going to receive a certain signal ($X_{3k}(T)$) from the neighboring first type node ($AP_2$), where the certain signal ($X_{3k}(T)$) is intended to be received by the first type node ($AP_1$) without interference from said overheard second type node ($U_{3k}$) that has been instructed to pause transmission.

11. The method according to claim 10, wherein the method comprises performing channel measurements in order to determine the presence of overheard second type nodes ($U_{3k}$) and isolated second type nodes ($U_{3j}$), where an overheard second type node ($U_{3k}$) is able to communicate with the serving first type node ($AP_3$), and to communicate with the first type node ($AP_1$) that is separate from the serving first type node ($AP_3$), and where an isolated second type node ($U_{3j}$) is able to communicate with its serving first type node ($AP_3$) only.

12. The method according to claim 10, wherein the method comprises:
at a first time instant (T), receiving and buffering both a first signal ($x_{3j}(T-2)$) from a neighboring first type node ($AP_2$) and an overheard second signal ($X_{3k}(T)$) from the overheard second type node ($U_{3k}$);
at a future time instant (T+2), receiving and buffering the second signal ($X_{3K}(T)$) from the neighboring first type node ($AP_2$), the second signal ($X_{3k}(T)$) from the neighboring first type node ($AP_2$) being intended to be received by the first type node ($AP_1$) without interference from said overheard second type node ($U_{3k}$); and
separating and decoding the received and buffered signals ($X_{3k}(T)$, $X_{3j}(T-2)$).

13. The method according to claim 12, wherein the separating and decoding the received and buffered signals ($X_{3k}(T)$, $X_{3j}(T-2)$) comprises using successive interference cancelling.

14. The method according to claim 10, wherein the communication between all first type nodes ($AP_0$, $AP_1$, $AP_2$, $AP_3$) is a backhaul communication via at least one corresponding backhaul channel ($H_{10}$, $H_{21}$, $H_{32}$), and where at least one first type node ($AP_3$) is adapted to communicate with a corresponding group of second type nodes ($U_{3k}$, $U_{3j}$) via a corresponding access channel ($h_{3k\_3}$, $h_{3j\_3}$), where the backhaul communication and the access communication both are performed by means of common equipment at each one of the first type nodes ($AP_0$, $AP_1$, $AP_2$, $AP_3$).

15. A method in an overheard second type node ($U_{3k}$) in a wireless communication system, wherein the method comprises
communicating with a serving first type node ($AP_3$) in the wireless communication system via a corresponding access channel ($h_{3k\_3}$), and
communicating with another first type node ($AP_1$) in the wireless communication system via a corresponding overheard access channel ($h_{3k\_1}$),
pausing transmission to the serving first type node ($AP_3$) at time instants (T+2) when the other first type node ($AP_1$) is going to receive a certain signal ($X_{3k}(T)$) from a neighboring first type node ($AP_2$), where the certain signal ($X_{3k}(T)$) is intended to be received by the other first type node ($AP_1$) without interference from the overheard second type node ($U_{3k}$) that has been instructed to pause transmission.

16. The method according to claim 15, wherein the method comprises receiving instructions from the serving first type node ($AP_3$) or the other first type node ($AP_1$), where the instructions relate to at which time instants to pause transmission to the serving first type node ($AP_3$).

17. A method in a first type node ($AP_3$) in a wireless communication system, where the method comprises:
communicating with at least one neighboring first type node ($AP_2$) in the wireless communication system via a corresponding backhaul channel ($H_{32}$); and
communicating with a corresponding group of second type nodes ($U_{3k}$, $U_{3j}$) via a corresponding access channel ($h_{3k}$, $h_{3j}$); wherein the method further comprises:
acquiring information regarding the presence of overheard second type nodes ($U_{3k}$) and isolated second type nodes ($U_{3j}$), where an overheard second type node ($U_{3k}$) is able to communicate with the first type node ($AP_3$), and to communicate with a remote first type node ($AP_1$) that is separate from the first type node ($AP_3$), and where an isolated second type node ($U_{3j}$) is able to communicate with the type node ($AP_3$) only.

18. The first type node ($AP_3$) according to claim 17, wherein the method further comprises pairing one overheard second type node ($U_{3k}$) with one isolated second type node ($U_{3j}$), and controlling synchronization of signal data transmissions of the paired second type nodes ($U_{3j}$, $U_{3k}$).

19. A method in a wireless communication system, comprising first type nodes ($AP_0$, $AP_1$, $AP_2$, $AP_3$) and second type nodes ($U_{3k}$, $U_{3j}$), where the communication between all first type nodes ($AP_0$, $AP_1$, $AP_2$, $AP_3$) is a backhaul communication via at least one corresponding backhaul channel ($H_{10}$, $H_{21}$, $H_{32}$), and where at least one first type node ($AP_3$) is adapted to communicate with a corresponding group of second type nodes ($U_{3k}$, $U_{3j}$) via a corresponding access channel ($h_{3k\_3}$, $h_{3j\_3}$), where the backhaul communication and the access communication both are performed by means of common equipment at each one of the first type nodes ($AP_0$, $AP_1$, $AP_2$, $AP_3$), wherein the method comprises:
performing channel measurements in order to determine the presence of overheard second type nodes ($U_{3k}$) and isolated second type nodes ($U_{3j}$), where an overheard second type node ($U_{3k}$) is able to communicate with its serving first type node ($AP_3$), and to communicate with a remote first type node ($AP_1$) that is separate from its serving first type node ($AP_3$), and where an isolated second type node ($U_{3j}$) is able to communicate with its serving first type node ($AP_3$) only,
pairing one overheard second type node ($U_{3k}$) with one isolated second type node ($U_{3j}$); and
controlling synchronization of signal data transmissions of the paired second type nodes ($U_{3j}$, $U_{3k}$).

\* \* \* \* \*